United States Patent [19]

Tanaka

[11] Patent Number: 5,408,671
[45] Date of Patent: Apr. 18, 1995

[54] SYSTEM FOR CONTROLLING SHARED REGISTERS

[75] Inventor: Kouji Tanaka, Tokyo, Japan

[73] Assignee: NEC Corporation, Tokyo, Japan

[21] Appl. No.: 854,409

[22] Filed: Mar. 19, 1992

[30] Foreign Application Priority Data

Mar. 27, 1991 [JP] Japan .................................. 3-087843

[51] Int. Cl.6 .............................................. G06F 13/00
[52] U.S. Cl. ...................................... 395/800; 395/425; 395/400; 364/228.1; 364/229; 364/230.5; 364/230.6; 364/DIG. 1
[58] Field of Search ............... 395/800, 425, 400, 275, 395/250, 325, 200; 364/DIG. 1, DIG. 2, 228.1, 229, 230.5, 230.6

[56] References Cited

U.S. PATENT DOCUMENTS

| | | | |
|---|---|---|---|
| 3,735,360 | 5/1973 | Anderson et al. | 395/250 |
| 4,110,830 | 8/1978 | Krygowski | 395/275 |
| 4,136,386 | 1/1979 | Annunziata et al. | 395/425 |
| 4,513,367 | 4/1985 | Chan et al. | 395/425 |
| 4,885,680 | 12/1989 | Anthony et al. | 395/425 |

FOREIGN PATENT DOCUMENTS 0170443 2/1986 European Pat. Off. .
WO88/07720 3/1988 WIPO .

OTHER PUBLICATIONS

Mano "Computer System Architecture", 1982, pp. 454–457.

Primary Examiner—Alyssa H. Bowler
Assistant Examiner—Dzung Nguyen
Attorney, Agent, or Firm—Foley & Lardner

[57] ABSTRACT

By using a shared register directory having a bit array corresponding one to one to the processor for each shared register, a shared register control portion of a shared register control system in a multiprocessor system monitors to which processor each of the registers shared between processors is currently allocated or if it is not allocated to any of the processors at all (unoccupied condition), and allocates any arbitrary shared register in response to the request from each processor while allowing access to the allocated share register. A task on the processor, which had been initially using the shared register, can be switched even if another task using the same register is being executed on any other processor, and the throughput of the multiprocessor system using the shared register can be increased.

2 Claims, 4 Drawing Sheets

SYSTEM FOR CONTROLLING SHARED REGISTERS

BACKGROUND OF THE INVENTION

1. Field of the Invention

The present invention relates to a shared register control system in a multiprocessor computer system.

2. Prior Art

Conventionally, as this kind of shared register control system, the following system has been proposed, in which, first, the same number of shared registers as that of processors is previously made to correspond one to one to the processor and, normally, each processor uses a specific shared register. Sharing of the register between the processors is achieved by logically dividing a plurality of processors into a master and slave processors so that a shared register used by the master processor, which corresponds to the same processor, may be shared with the slave processors, or its sharing is canceled (master/slave system).

According to the above-described prior art shared register control system, a shared register corresponding to a specific processor, which has been used for a task operating on the master processor, is shared among other tasks operating on the slave processors so that the tasks may communicate among each other via the same shared register.

In addition, if the task is switched on the slave processor and another task runs, which no longer uses the shared register corresponding to the master processor, then a shared register corresponding to that slave processor may be allocated to that another task to allow it to be executed. On the other hand, since the register corresponding to the master processor is not shared with the slave processors any more, another task can be executed by using it. However, since the master processor cannot exclusively share the registers corresponding to the other processors, as long as, for example, the slave processor continues to use the shared register corresponding to the master processor, the task being executed on the master processor cannot be switched to any other task to use the shared register thereon.

SUMMARY OF THE INVENTION

It is an object of the present invention to provide a system for controlling a shared register control system which allows a more flexible sharing control to be achieved over the shared register.

According to the present invention, a system for controlling a register shared among processors in a multiprocessor computer system comprising a plurality of processors is provided which comprises registers shared among processors, which are accessible from a plurality of processors and which are present in the same manner as that of the processors, and a shared register control portion having a shared register directory providing a bit array corresponding one to one to each processor for each shared register, the shared register control portion managing allocation of the shared registers to the processors and their unoccupied condition according to the setting and resetting of each bit of the bit array of the shared register directory, to thereby allocate any arbitrary shared register in response to the request from each processor.

Further, the above-described shared register control portion includes a shared bit reset means for, among bits of a bit array of the shared register directory, which corresponds to a shared register which has been used by a processor, resetting a bit corresponding to that processor, a shared bit set means for, among bits of a bit array of the shared register directory, which corresponds to a shared register to be used anew by the processor, setting a bit corresponding to the same processor, a shared register selector means for selecting a shared register corresponding to a bit array all the bits of which are reset and an access control means for allowing access from a processor corresponding to a set bit of the bits of each bit array to a shared register corresponding to the bit array including the set bit.

That is, according to the shared register control system of the present invention, the shared register control portion, which is independent of each processor, monitors to which processor the shared registers, which are each accessible from the plurality of processors and are present in the same number as that of the processors, are each allocated, or whether they are not allocated to any of the processors (unoccupied condition), by using a shared register directory having a bit array corresponding one to one to the processor for each shared register so that it may allocate any arbitrary shared register in response to the request from each processor.

Usually, an independent shared register is allocated to each processor. And, if, with this condition, a certain processor (A) shares a shared register b which has been used by another processor (B), then, among the bits of the bit array which correspond to the previously used shared register (a), a bit corresponding to the processor (A) is reset by the shared bit reset means while a bit of the array corresponding to the processor (B), which is shared anew by the processor (A), is set by the shared bit set means. In consequence, the access control means allows the shared registers (a) and (b) to have access from the processors (A) and (B). In addition, at this point, the shared register a is managed in the unoccupied condition as unused. Then, if the processor (B) stops use of the shared register (b) and requests to use the unoccupied shared register, then the shared bit reset means of the shared register control portion rests the bit of the array (corresponding to the shared register (b) for the shared register directory), which corresponds to the processor (B), the shared register selector means selects the shared register (a) corresponding to the bit array all bits of which are reset and the shared bit set means sets the bit of the bit array corresponding to the shared register (a) of the shared register directory, which corresponds to the processor (B). As a result, the access control means allows access from the processor (B) to the shared register (a).

Further objects and advantages of the present invention will be described in greater detail with reference to the accompanying drawings.

DETAILED DESCRIPTION OF THE PREFERRED EMBODIMENT

Figure 1:
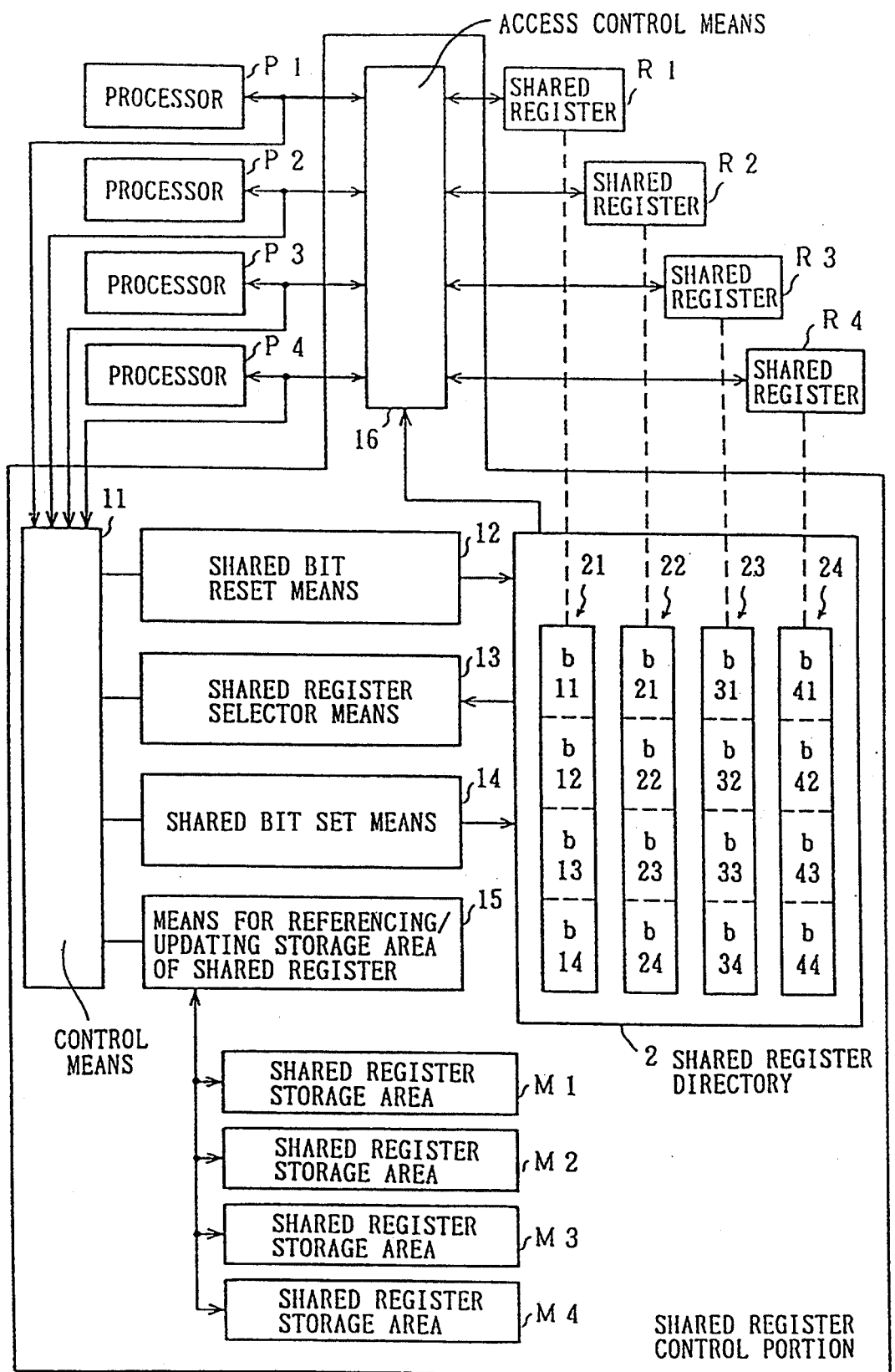
FIG. 1 is a block diagram of the essential portion of a multiprocessor system embodying a shared register control system according to the present invention.

FIG. 1 is a block diagram of the essential portion of a multiprocessor computer system embodying a shared register control system according to the present invention. This system comprises four processors P1, P2, P3 and P4, four shared registers R1, R2, R3 and R4 accessible from each of the processors P1 through P4 and a shared register control portion 1.

The shared register control portion 1 is provided for controlling sharing of the shared registers R1 through R4 among processors P1 through P4, and includes a shared register directory 2, a control means 11, a shared bit reset means 12, a shared register selector means 13, a shared bit set means 14, a means 15 for referencing and updating a storage area of the shared register, an access control means 16 and shared register storage areas M1 through M4.

The shared register directory 2 includes bit arrays 21 through 24 corresponding one to one to the shared registers R1 through R4. Each of the bit arrays 21 through 24 is comprised of four bits, and bits b11, b21, b31 and b41 each correspond to the processor P1, bits b12, b22, b32 and b42 to the processor P2, bits b13, b23, b33 and b43 to the processor P3 and bits b14, b24, b34 and b44 to the processor P4. In this embodiment, according to the value of each bit (logic value 1 or 0), it is monitorred which shared register is being used by which processor. For example, if the shared register R1 is being used by the processor P1, then, among the bits b 11, b12, b13 and b14 of the bit array 21 corresponding to the shared register R1, only the bit b11 corresponding to the processor P1 is set to the logic value 1, and the rest b12, b13, and b13 is set to the logic value 0. In addition, if the same register R1 is used together by the processors P1 and P2, then the bits b11 and b12 are set to the logic value 1, and the rest b13 and b14 is set to the logic value 0.

The access control means 16 allows access from any processor corresponding to the set bit of each of bit arrays 21 through 24 of the shared register directory to any of the shared registers R1 through R4 corresponding to the bit array including that set bit. Each of the processors P1 through P4 has access to the shared registers R1 through R4 via this access control means 16.

The shared bit reset means 12 changes any bit set to the logic value 1, which is included within the bit arrays 21 through 24 of the shared register directory 2, into the logic value 0.

The shared register selector means 13 searches for any bit array all the bits of which are set to the logic value 0 from among the bit arrays 21 through 24 to find out a shared register which is not being used by any processor.

In contrast to the shared bit reset means 12, the shared bit reset means 14 changes any bit set to the logic value 0, which is included within the bit arrays 21 through 24 of the shared register directory 2, into the logic value 1.

The shared register storage areas M1 through M4 each correspond one to one to the processors P1 through P4 to retain information which indicates the shared register used by each processor.

The means 15 for referencing and updating the shared register storage area detects the shared register currently used by each of the processor by referring to the content of the shared register storage areas M1 through M4 each corresponding to the processor, and synchronously updates the content of the corresponding shared register storage areas M1 through M4 when the used shared register is switched.

The control means 11 receives the request for the shared registers R1 through R4 from each processor P1 through P4, and controls each of the above-described means 12 through 15 to control sharing of the shared registers R1 through R4 among the processors P1 through P4.

Next, the operation of this embodiment is described.

In the multiprocessor computer system according to the embodiment of FIG. 1, in its initial condition, an independent shared register is allocated to each of the processors P1 through P4.

Figure 2:
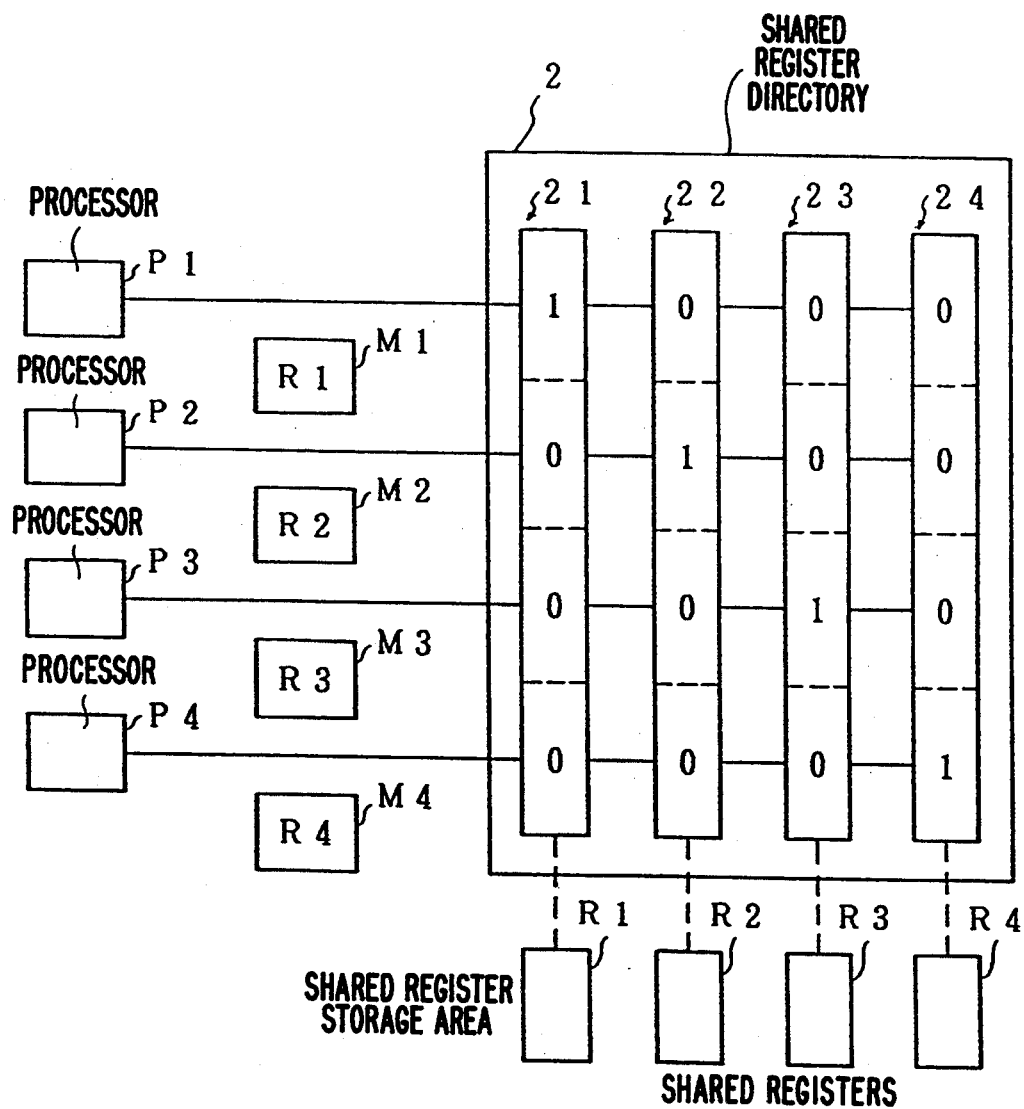
FIG. 2 is a view illustrating a condition in which an independent shared register is allocated to each processor.

FIG. 2 is an explanatory view of such an initial condition, in which, among the bits b11 through b14 of the bit array 21 of the shared register directory 2, only the bit b11 is set to the logic value 1 so that the shared register R1 is used by only the processor P1. Similarly, only the bit 22 of the bit array 22, only the bit b33 of the bit array 23 and the bit b44 of the bit array 24 are each set to the logic value 1 so that the shared registers R2, R3 and R4 are each used by only the processors P2, P3 and P4 respectively. Incidentally, at this time, information indicating the shared registers R1, R2, R3 and R4 is stored within the shared register storage areas M1, M2, M3 and M4.

If the content of the shared register directory 2 is as shown in FIG. 2 and any shared register is allowed access by the processors P1, P2, P3 and P4, then the access control means 16 can make it possible to access the shared registers R1, R2, R3 and R4, respectively.

Under the condition of FIG. 2, if, for example, a task being executed on the processor P1, which had been using the shared register R1, is switched and, for example, another task using the shared register R2, which has been used by the task operating on the processor P2, is to be executed, then the processor P1 requests of the shared register control portion 1 to share the shared register being used by the processor P2.

The control means 11 of the shared register control portion 1, which has received the request, first refers to the shared register storage area M1 corresponding to the processor P1 by the means 15 for referencing and updating the shared register storage area to recognize that the shared register R1 being currently used by the processor P1 is R1. Then, as shown in FIG. 3, by the shared bit reset means 12, the bit b11 (corresponding to the processor P1) of the bit array 21 corresponding to the shared register R1, which has been used by the processor P1, is reset to the logic value 0.

Figure 3:
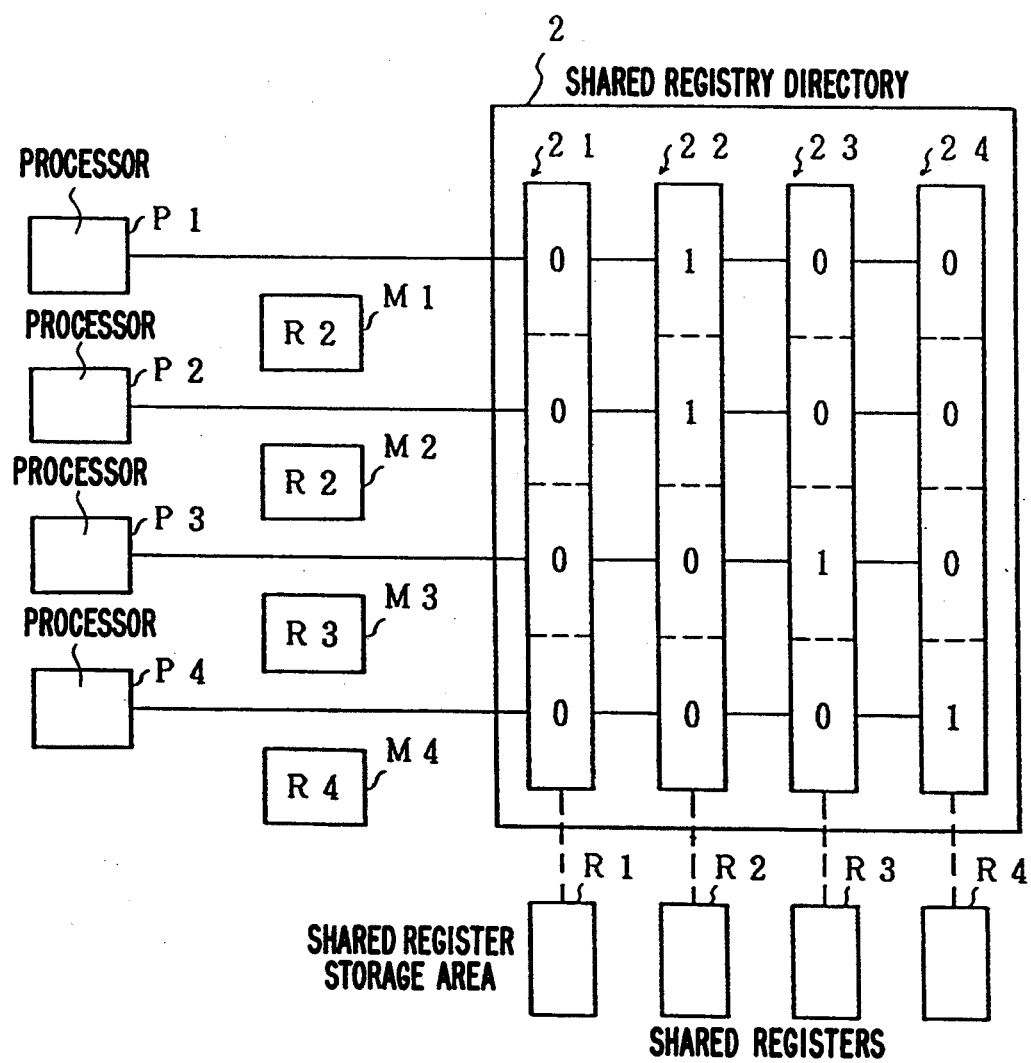
FIG. 3 is a view illustrating a condition in which, in the condition of FIG. 2, a shared register R2 is used for a processor P1.

Next, the control means 11 refers to the shared register storage area M2 corresponding to the processor P2 by the means 15 for referencing and updating the shared register storage area, and recognizes that the shared register R2 being currently used by the processor P2 is R2, to thereby set the bit b21 (corresponding to the processor P1) of the bit array 22 corresponding to the shared register R2 being used by the processor P2 to the logic value 1 by the shared bit set means 14, as shown in FIG. 3.

Next, since the shared register used by the processor P1 has been switched from R1 to R2, the control means 11 changes the content of the shared register storage area M1 corresponding to the processor P1 into the information indicating the shared register R2, as shown in FIG. 3, by the means 15 for referencing and updating the shared register storage area.

By such an operation carried out by the shared register control portion 1, when any access is made from the processor P1, the access control means 16 makes the shared register R2 accessible in place of the shared register R1. Since the shared register R2 is also being used by the processor P2, both processors P1 and P2 will share the shared register R2.

Next, in the condition of FIG. 3, if the task being executed on the processor P2, which has shared the shared register R2 with the processor P1, is switched and a task using a shared register which is not used at all, that is, any shared register different from those for the tasks being executed on other processors P1, P3 and P4, is executed by the processor P2, then the processor P2 requests use of the unoccupied shared register of the shared register control portion 1.

Upon receipt of this request, the control means 11 of the shared register control portion 1 first refers to the shared register storage area M2 corresponding to the processor P2 by the means 15 for referencing and updating the shared register storage area to recognizes that the shared register being currently used by the processor P2 is R2. Then, as shown in FIG. 4, by the shared bit reset means 12, the bit 22 (corresponding to the processor P2) of the bit array 22 corresponding to the shared register R2, which has been used by the processor P2, is reset to the logic value 0, as shown in FIG. 4.

Next, the control means 11 selects the shared register corresponding to the bit array all the bits of which are set to the logic value 0 by the shared register selector means 13. In this case, as shown in FIG. 3, all the bits b11 through b14 of the bit array 21 have been set to the logic value 0 and, hence, the shared registered R1 will be selected.

The control means selects the shared register corresponding to the bit array all the bits of which are set to the logic value 0 by the shared register selector means 13. In this case, as shown in FIG. 3, all the bits b11 through b14 of the bit array 21 are each set to the logic value 0 and, hence, the shared register R1 will be selected.

Figure 4:
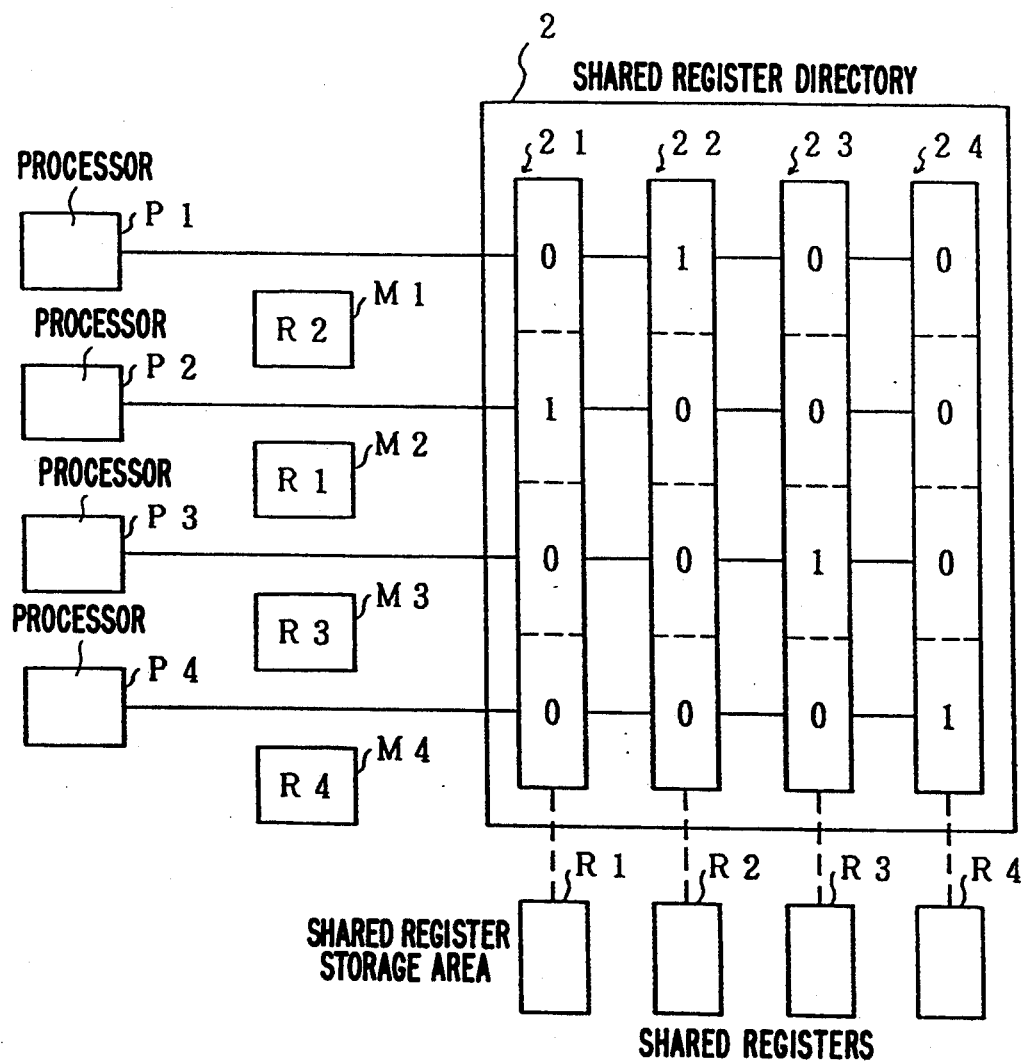
FIG. 4 is a view illustrating a condition in which, in the condition of FIG. 3, an unused shared register R1 is used for a processor P2.

Next, as shown in FIG. 4, the control means 11 sets the bit b12 (corresponding to the processor P2) of the bit array 21 corresponding to the above-described selected shared register R1 to the logic value 1.

In addition, since the shared register used by the processor P2 has been switched, the control means 11 changes the content of the shared register storage area M2 corresponding to the processor P2 into one indicating the shared register R1, as shown in FIG. 4, by the means 15 for referencing and updating the shared register storage area.

By the above-described operation carried out by the shared register control portion 1, when any access is made by the processor P2, the access control means 16 makes the shared register R1 accessible in place of the shared register R2.

As described above, according to this embodiment, a more efficient allocation of the shared registers becomes possible among the processors in the multiprocessor computer system, and not to say of the allocating mode of the shared registers, which is the case with the conventional master/slave system, any other allocating modes can be realized. In consequence, the task on the processor, which had initially used the shared register, can be switched even if any other task using the same shared register is being executed on any other processor, and the throughput of the multiprocessor computer system using the shared register can be increased.

Incidentally, although, in this embodiment, the shared register storage areas M1 through M4 are provided so that the shared register being used by each of the processors P1 through P4 may immediately be detected, they may alternatively be eliminated because a similar detection can be achieved by referring to the shared register directory 2.

What is claimed is:

1. A system for controlling registers shared among a plurality of processors in a multiprocessor computer system comprising:

a plurality of shared registers each being accessed from said processors, said shared registers being present in a number corresponding to that of said processors; and a shared register control portion having a shared register directory providing bit arrays corresponding one-to-one to said processors for each of said shared registers, wherein said shared register control portion manages allocation of said shared registers to said processors and their unoccupied condition according to a setting and a resetting of each bit of the bit arrays of said shared register directory and allocates any arbitrary shared register in response to a request for allocation of an unoccupied register from each of said processors and wherein said shared register control portion further comprises, control means connected to said processors to receive a request for said shared registers and for controlling changing the bits of said shared register directory;

shared bit reset means, shared register selector means and shared bit set means connected between said control means and said shared register directory, said shared bit set means setting bits of said bit arrays of said shared register directory, said shared bit reset means resetting a bit of said bit arrays of said shared register directory corresponding to a shared register whose use is to be discontinued by one of said processors, said shared register selector means selecting one of said shared registers corresponding to said bit array, all the bits of which are reset; and access control means, connected between said processors and said shared registers, for allowing access from one of said processors corresponding to one of the set bits of each bit array of said shared register directory to a shared register corresponding to a shared register corresponding to a bit array including said bit.

2. A multiprocessor Computer system including a plurality of processors, comprising:

a plurality of shared registers, equal in number to the plurality of processors, each of said shared registers selectably connected to each of said processors;

a shared register controller, connected between said processors and Said shared register, said shared register controller including a shared register directory having a plurality of bit arrays, one bit array corresponding to each of said shared registers, each of said bit arrays including a bit corresponding to each of said processors, a bit set to a first logical value in a bit array indicating that one of said processors, corresponding to said bit, is using the shared register corresponding to said bit array, a bit set to a second logical value indicating that the corresponding processor is not using the shared register corresponding to said bit array, said shared register controller effective to allocate said shared registers to said processors upon a request from said processors by setting and resetting bits in said bit arrays and wherein said shared register controller further comprises, control means receiving requests for said shared registers from said processors;

shared bit set means, connected between said control means and said bit arrays, for resetting a bit in said bit arrays corresponding to a processor request for use for one of said shared registers to said first logical value;

shared bit reset means, connected between said control means and said bit arrays, for resetting a bit of said bit arrays corresponding to a shared register whose use is to be discontinued by one of said processors, to said second logical value;

shared register selector means, connected between said control means and said bit arrays, for determining a bit array all of whose bits are set to said second logical value indicating that the corresponding shared register is not being used by any of said processor; and access control means for selectably connecting said processors to said shared registers according to said bits of said bit arrays.

* * * * *